Patented Feb. 5, 1929.

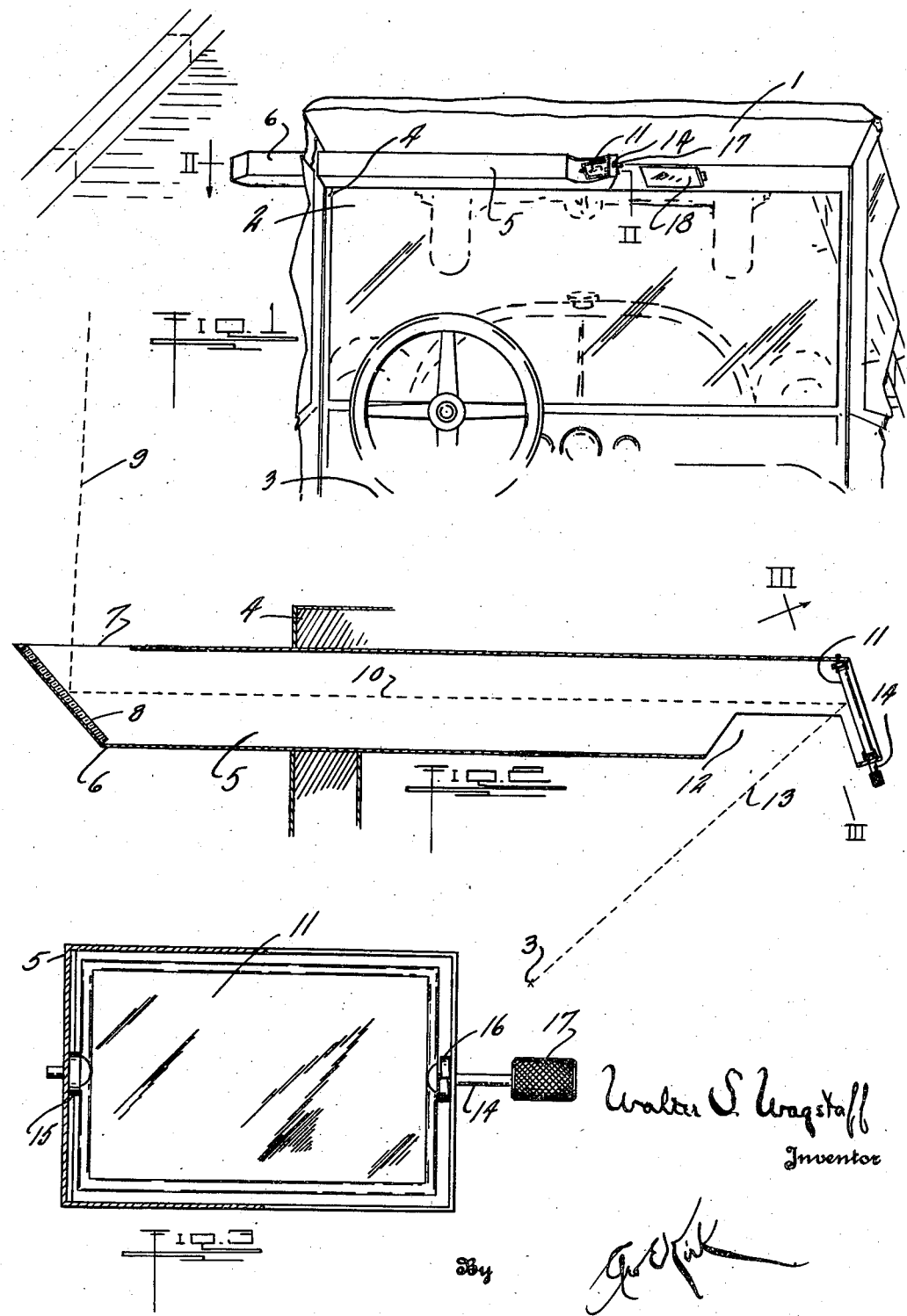

1,700,754

UNITED STATES PATENT OFFICE.

WALTER S. WAGSTAFF, OF MIAMI, FLORIDA.

SUPPLEMENTAL VISION APPARATUS.

Application filed October 4, 1926. Serial No. 139,356.

This invention relates to supplemental vision mechanism, especially for vehicles.

This invention has utility when incorporated for parallel vision forward of the vehicle to check up say as to vehicles ahead, as in a column or parade, without the necessity of the driver getting out of the vehicle line or sticking his head out laterally of his vehicle.

Referring to the drawings:

Fig. 1 is a fragmentary view from within a vehicle, which vehicle is equipped with an embodiment of the invention herein;

Fig. 2 is a section through the device of the invention on the line II—II, Fig. 1; and Fig. 3 is a section on the line III—III, Fig. 2, looking in the direction of the arrow.

Motor vehicle 1 is shown as having windshield 2 and driver's station 3. This windshield 2, in the instance of a closed vehicle, is in the vehicle body or housing 4. Herein, in accordance with the device of the invention, there is provided a light box or channel 5 supported by the vehicle body 4 and extending from within the vehicle forward of the driver's station 3 laterally outward of the vehicle and having projecting portion 6 provided with window 7 adjacent which is disposed reflector 8 at such an angle that rays of light 9 from forwardly of the vehicle 1 and laterally may be received by the reflector 8 and projected on line 10 through the light box 5, to supplemental reflector 11, there to be projected through window 12 as rays 13 to the driver's station 3.

In practice, the light box 5 and mirror or reflector 8, after once fixed in the vehicle body 4, may be left so positioned as to have the range forward laterally of the vehicle approximately parallel with the side and parallel with the travel direction of the vehicle. There is thus a ready means for disclosing whether or not in driving along a road with one or more vehicles directly ahead, there may be clearance space for the operator to get around to gain an advance position, and whether or not there is clearway in the road to permit taking such driving around course.

The second reflector 11 is herein shown as mounted on pin 14 in bearings 15, 16, with frictional gripping. Knurled extension 17 from the pin 14 may be operated in the slight tilting of this reflector 11 for bringing the rays 13 into the desired elevation or line of vision preferred by the driver as located at the driver's station 3.

It is convenient in this embodiment say for closed car structures to have the parallel forward vision mirror located in the car adjacent rear vision mirror 18. The driver is thus readily apprised of traffic conditions by glancing above the windshield 2 to see whether or not there may be a car following attempting to drive around the vehicle as equipped herein for safety in this regard, and it is also possible without getting out of the line of driving for the driver to locate the possibilities for vehicle advance by driving around vehicles ahead. This is not only a convenience, but a safeguard as well in driving, and is simple in its application and involves, as a periscope, horizontal parallel vision advantages.

When it is desired not to use the device, as at night when an approaching headlight glare is reflected, the adjustment may be readily made to deflect such rays so as to avoid annoying the driver.

What is claimed and it is desired to secure by United States Letters Patent is:—

1. A motor vehicle supplemental vision apparatus for assembly with a motor vehicle body having a driver's station and a lateral opening forwardly of the driver's station, comprising a light box adapted to be mounted in the opening and extend therefrom at one side of the vehicle, said box having terminally disposed windows, and reflectors adjacent said windows, the box being adapted to be anchored to position the outer window forwardly and the inner window rearwardly with a terminus of the box within the vehicle body whereby the inner window is a viewing window from the driver's station.

2. For a motor vehicle closed body having in an upper portion a lateral opening, a light box adapted to be mounted in the opening and extend therefrom at one side of the vehicle, said box having terminally disposed windows, reflectors adjacent said windows, the box being adapted to be anchored to position the outer window forwardly and the inner window rearwardly as a viewing window from within the closed body, and means for adjusting the inner window reflector.

3. For a motor vehicle closed body having in an upper portion a lateral opening, a light box adapted to be mounted in the opening and extend therefrom at one side of the vehicle, said box having terminally disposed windows, reflectors adjacent said windows, the box being adapted to be anchored to position the outer window forwardly and the inner window rearwardly as a viewing window from within the closed body, and horizontal axis rocking means for adjusting the inner reflector.

In witness whereof I affix my signature.

WALTER S. WAGSTAFF.